United States Patent [19]
Harrison et al.

[11] Patent Number: 5,257,575
[45] Date of Patent: Nov. 2, 1993

[54] JUICE EXTRACTORS WITH SPLASH PREVENTION

[75] Inventors: Robert G. Harrison, Poulsbo; Robert D. Lamson, Seattle, both of Wash.

[73] Assignee: Trillium Health Products, Inc., Seattle, Wash.

[21] Appl. No.: 821,757

[22] Filed: Jan. 15, 1992

Related U.S. Application Data

[63] Continuation-in-part of Ser. No. 811,572, Dec. 20, 1991, abandoned.

[51] Int. Cl.⁵ .............................................. A23N 1/00
[52] U.S. Cl. ...................................... 99/511; 99/513
[58] Field of Search ......................... 99/495, 509–513, 99/456, 458, 503; 210/371, 369, 360.1; 241/37.5, 92; 494/43, 56; 366/314; 100/116

[56] References Cited

U.S. PATENT DOCUMENTS

| | | | |
|---|---|---|---|
| 2,409,497 | 10/1946 | Kessel | 99/511 |
| 2,660,211 | 11/1953 | Berglind | 99/512 |
| 2,845,971 | 8/1958 | Cordero | 99/512 |
| 2,901,015 | 8/1959 | Swenson et al. | 99/512 |
| 3,186,458 | 6/1965 | Takei et al. | 99/512 |
| 4,183,293 | 1/1980 | Arao et al. | 99/513 |
| 4,506,601 | 3/1985 | Ramirez et al. | 99/513 |
| 4,681,031 | 7/1987 | Austad | 99/511 |
| 4,700,621 | 10/1987 | Elger | 99/495 |
| 4,716,823 | 1/1988 | Capdevila | 99/510 |
| 5,031,522 | 7/1991 | Brixel et al. | 210/360.1 |

FOREIGN PATENT DOCUMENTS

| | | | |
|---|---|---|---|
| 1905371 | 8/1970 | Fed. Rep. of Germany | 99/513 |
| 742343 | 12/1955 | United Kingdom | 99/511 |
| 773263 | 4/1957 | United Kingdom | 99/511 |
| 1005529 | 9/1965 | United Kingdom | 99/511 |

*Primary Examiner*—Timothy F. Simone
*Attorney, Agent, or Firm*—Hughes & Multer

[57] ABSTRACT

A juice extractor for extracting juices from produce such as fruits and vegetables. The juice extractor has a base which includes a housing and a motor with a vertically aligned drive shaft. A blade basket detachably mounted on the base and rotated by the output shaft separates produce into pulp and juice, and a juice bowl surrounding the blade basket collects the juice. An interlock system keeps the motor from being turned on until the juice bowl is locked to the base and a cover is locked onto the juice bowl. Juice flows from the juice bowl through a spout to an appropriate container. A spray cap keeps juice from splashing as it pours through the spout.

9 Claims, 2 Drawing Sheets

JUICE EXTRACTORS WITH SPLASH PREVENTION

RELATION TO ANOTHER APPLICATION

The present invention is a continuation-in-part of application Ser. No. 07/811,572 filed Dec. 20, 1991 now pend. for JUICE EXTRACTORS.

TECHNICAL FIELD OF THE INVENTION

The present invention relates to juice extractors and, more specifically, to novel, improved juice extractors so constructed that juice is kept from splashing as it pours through the juice discharging spout of the extractor.

BACKGROUND OF THE INVENTION

Parent application Ser. No. 07/811,752 discloses a state-of-the-art juice extractor having: (a) a base which includes a housing and a motor; (b) a blade basket detachably coupled to the motor output shaft for separating the produce into pulp and juice as the basket rotates; (c) a blade basket-housing bowl for collecting the extracted juice; and (d) a juice bowl cover which confines the produce being juiced, the extracted juice, and the left behind pulp to the juice bowl and eliminates access to the rotating knife basket.

The juice bowl has an inner wall which keeps juice from splashing out of the bowl as it flows into the bowl through a screen or filter component of the blade basket. It also has a channel-like, open top spout through which the juice flows to a pitcher or other container. A novel baffle arrangement keeps the juice from splashing as it flows into the spout from a juice collecting sump in the juice bowl. Nevertheless, juice may still splash or spray into the surrounding environs as it flows through the open top juice discharge spout.

SUMMARY OF THE INVENTION

There have now been invented and disclosed herein new and novel juice extractors in which the splashing of juice discharged through the extractor's juice spout has been reduced to an at least inconsequential level.

In these novel juice extractors, the splashing problem is solved in an inexpensive and simple, yet effective fashion with a spray cap which is frictionally affixable to the juice discharge spout to close its open top. Aside from effectively performing its primary objective and its simplicity and availability at low cost, this novel spray cap has the advantage of ease of use. It can be removed when unneeded or to clean the juice discharge spout or for any other purpose without undoing any fasteners, and it can be reattached to the spout with the same degree of ease.

From the foregoing, it will be apparent to the reader that one important and primary object of the present invention is the provision of novel, improved juice extractors in which the splashing of juice through an extractor's juice discharge spout is reduced to an inconsequential level, if not entirely eliminated.

Other important objects as well as additional advantages and features of the invention will be apparent to the reader from the foregoing and the appended claims and as the ensuing detailed description and discussion of the invention proceeds in conjunction with the accompanying drawings.

DETAILED DESCRIPTION OF THE INVENTION

Figure 1:
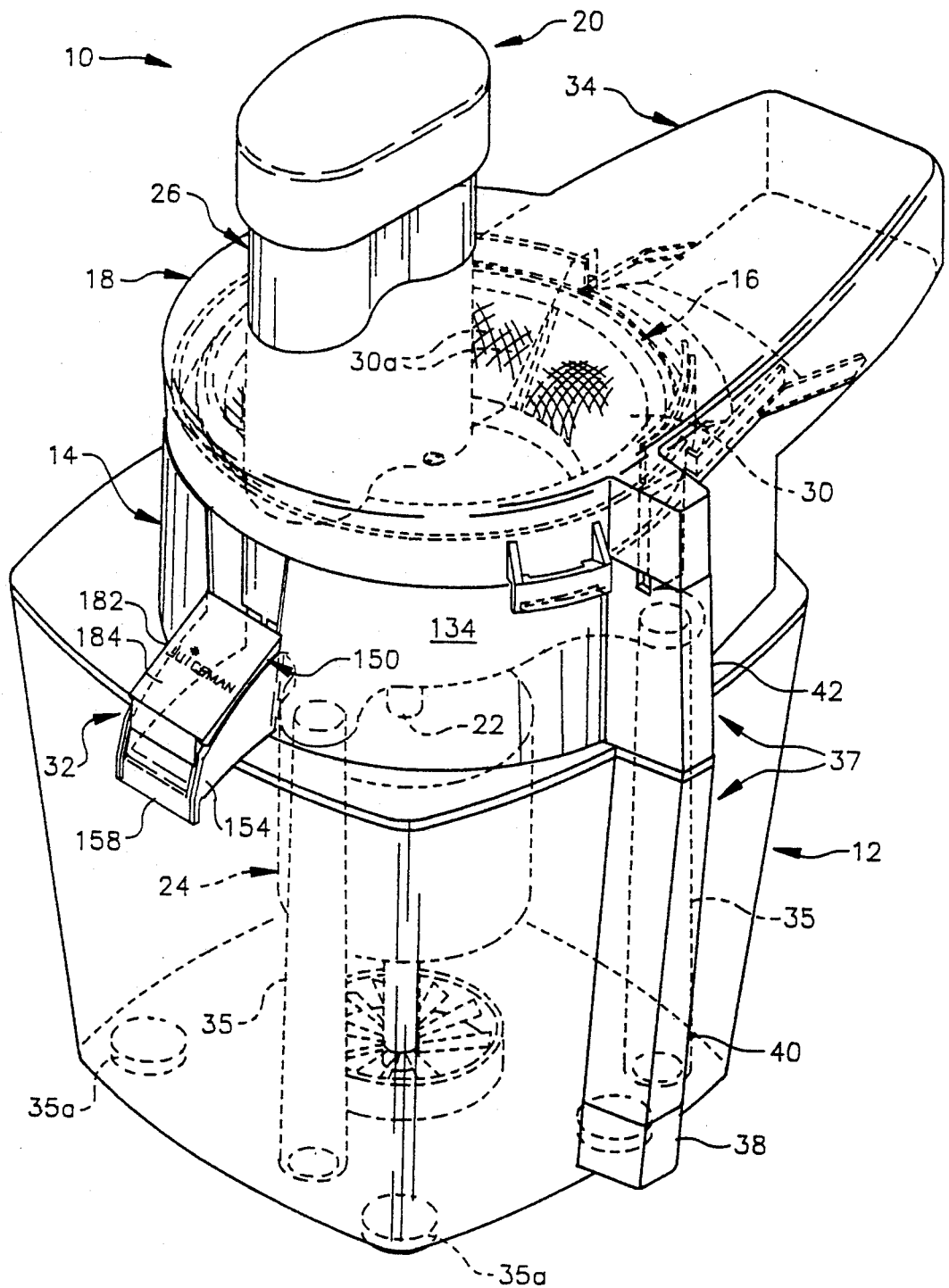
FIG. 1 is a perspective of a juice extractor with a juice bowl and an integrated juice discharge spout; juice is kept from splashing through this spout with a detachable spray cap in accord with the principles of the present invention.

Referring now to the drawings, FIGS. 1-4 depict a juice extractor 10 with the following major components: (a) a base 12; (b) a juice bowl 14; (c) a blade basket 16; (d) a juice bowl lid or cover 18; and (e) a feed plunger 20. Juice bowl 14 is assembled to juice extractor base 12. The blade basket 16 is surrounded by the juice bowl 14. It engages, and is rotated by, the drive shaft 22 of a motor 24 mounted in the housing 25 of base 12. Juice extractor cover 18 is assembled to the juice bowl 14 to isolate the rotating blade basket 16 from the surrounding environment and to confine the produce being processed, the extracted juice, and the pulp to the juice bowl.

In operation, fruits and/or vegetables are forced through a feed tube 26 in lid 18 by food plunger 20. Rotating blades (not shown) at the bottom of blade basket 16 comminute the produce forced through feed tube 26.

The comminuted pieces of produce are thrown against the inverted-frustoconical wall 30 of blade basket 16. Centrifugal force forces the juice from the comminuted produce through holes 30a in blade basket wall 30. This juice collects in juice bowl 14 and flows from the interior of the juice bowl through a channel-like juice discharge spout 32 to an appropriate container (not shown). The pulp cannot pass through the holes 30a and is expelled by the rotation of basket 16 over the top of this basket and through a pulp chute 34 into a pulp container (not shown).

The motor 24 of juice extractor 10 is suspended in the housing 25 of juicer base 12 by three hollow legs or columnar supports 35 (two shown in FIG. 1) on which the integral mounting flanges 24a of motor 24 are seated. Resilient grommets (not shown) isolate juice extractor motor 24 from motor-supporting legs 35, thereby absorbing the vibration generated by the motor and the rotating blade basket 16 and preventing the transmission of this vibration to juice extractor base 12.

To further promote vibration-free operation of juice extractor 10, resilient feet 35a are attached to the bottom of the housing 25 of juicer base 12. These feet keep vibrations from being transferred to the surface on which the juice extractor 10 is placed and also allow a large frictional force to be generated between the juice extractor and the supporting surface. The result is that feet 35a keep the juice extractor from being walked along the supporting surface by vibration generated by motor 24 and blade basket 16 and not absorbed by the vibration absorbers which insulate motor 24 from its columnar supports 35.

A fan 36 is mounted on the lower end of motor output shaft 22. This fan draws cooling air into the housing 25 of base 12 through holes (not shown) in the bottom of the housing.

A motor interlock 37 with a base segment 38, a bowl segment 40, and a lid segment 42 extends vertically along the right-hand side of juice extractor 10. The bowl segment 40 so mechanically interconnects with the base and lid segments 38 and 42 that, only when these interlock column segments are properly aligned by locking the juice bowl to the base and the cover to the juice bowl, will the motor 24 be allowed to operate. Accordingly, interlock 37 prevents the user from accidentally coming into contact with the rotating blade basket 16 while juice extractor 10 is running.

Referring still to FIGS. 1–4, the juice bowl 14 of juice extractor 10 is a molded plastic component having three coaxially aligned, cylindrical, vertically extending walls: an outer wall 134, a splash wall 136, and an inner wall 138. An annular bottom wall 140 joins the splash wall 136 and inner wall 138 and cooperates with them to form an annular juice collecting basin around the inner juice bowl wall.

A spout inlet (or juice bowl outlet) 142 in splash wall 136 allows juice to flow into spout 32 from juice basin 141. An antisplash juice barrier 146, which is an extension of splash wall 136, defines the upper edge or boundary 147 of spout inlet 142.

Integral with and extending downwardly from juice barrier 146 and radially inward to the inner wall 138 of juice bowl 14 is a vertically oriented juice baffle 148 with adjoining, rectilinear and arcuate, upper edge segments 148a and 148b. This baffle, which is oriented radially relative to the vertical axis of the juice bowl, keeps juice from circulating around the annular juice collecting basin 141 by directing the juice into spout 32. Baffle 148 and barrier 146 prevent juice expelled from blade basket 16 by centrifugal force from splashing through outlet 142. Instead, the juice splashes against baffle 148 and barrier 146, drips into juice collecting basin 141, and flows gently into spout 32 with the rest of the juice.

Despite barrier 146 and baffle 148, juice discharged from the juice collecting sump 141 in juice bowl 14 through outlet 142 into spout 32 may undesirably splash into the surrounding environs as it pours through the spout. In juice extractor 10 this unwanted splashing is precluded by a novel, detachable, frictionally retained spray cap 150 in accord with the principles of the present invention.

Juice discharge spout 32 is an integral component of juice bowl 14 and extends radially from the outer wall 134 of the juice bowl. It has vertically extending, spaced apart side walls 152 and 154 at opposite sides of the outlet 142 from juice collecting basin 141. An integral bottom wall 156 at the lower edge of outlet 142 spans side walls 152 and 154. There is an antidrip lip 158 on bottom wall 156 at the outer end of spout 32.

Figure 2:
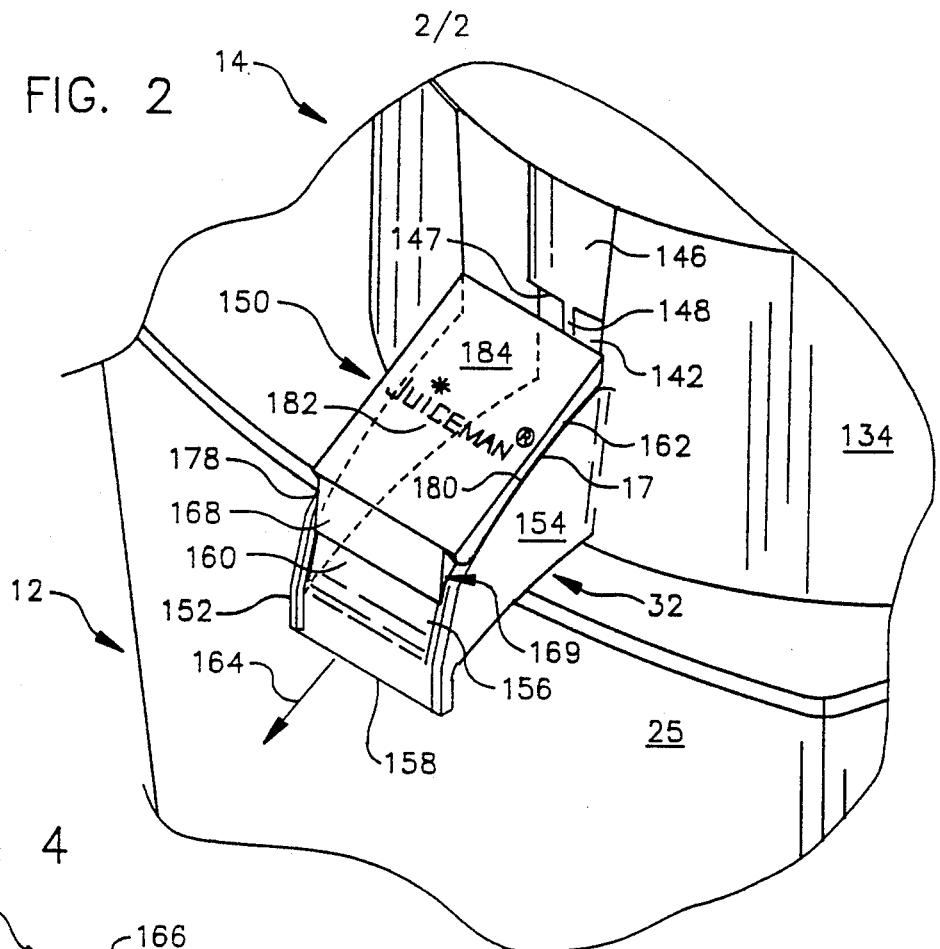
FIG. 2 is a fragment of FIG. 1 drawn to an enlarged scale.
Figure 4:
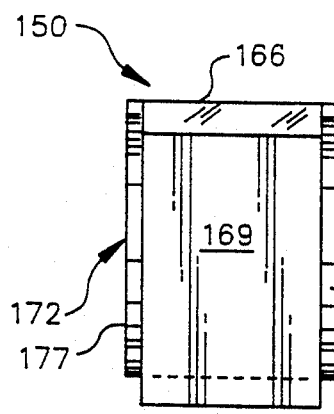
FIG. 4 is a bottom view of the spray cap.

As is perhaps best shown in FIG. 2, juice discharge spout 32 has an open top 162. Juices pouring from sump 141 through spout 32 in the direction indicated by arrow 164 can splash out of the spout through this open top absent the protection against splashing afforded by spray cap 150. The latter is a generally parallelepipedal component fabricated from an elastically distensible, preferably dishwasher safe material with a relatively high coefficient of friction; for example, the RR0629-70 ethylene propylene rubber available from Rainier Rubber Company.

Lengthwise, spray cap 150 is dimensioned to extend from the outer side wall 134 of juice bowl 14 to the outer end 160 of juice discharge spout 32. Beveled ends 166 and 168 at opposite ends of the spray cap respectively: (1) allow that component to be tightly fitted—i.e., sealed—against juice bowl side wall 134, and (2) match the configuration of the outer juice discharge spout end 160.

In the transverse or spanwise direction, the main body segment 169 of spray cap 150 is dimensioned for a snug, frictional fit between the side walls 152 and 154 of juice spout 32. Integral lips 170 and 172 extending laterally from the thus dimensioned main body segment 169 of spray cap 150 have bottom edges 176 and 177 configured to match the upper edges 178 and 180 of juice discharge spout side walls 152 and 154. With spray cap 150 in place, integral lips 170 and 172 rest on the upper side wall edges 178 and 180. This positions spray cap 150 such that it closes the open top 162 of spout 32 and supports the spray cap from the juice spout side walls 152 and 154.

Figure 3:
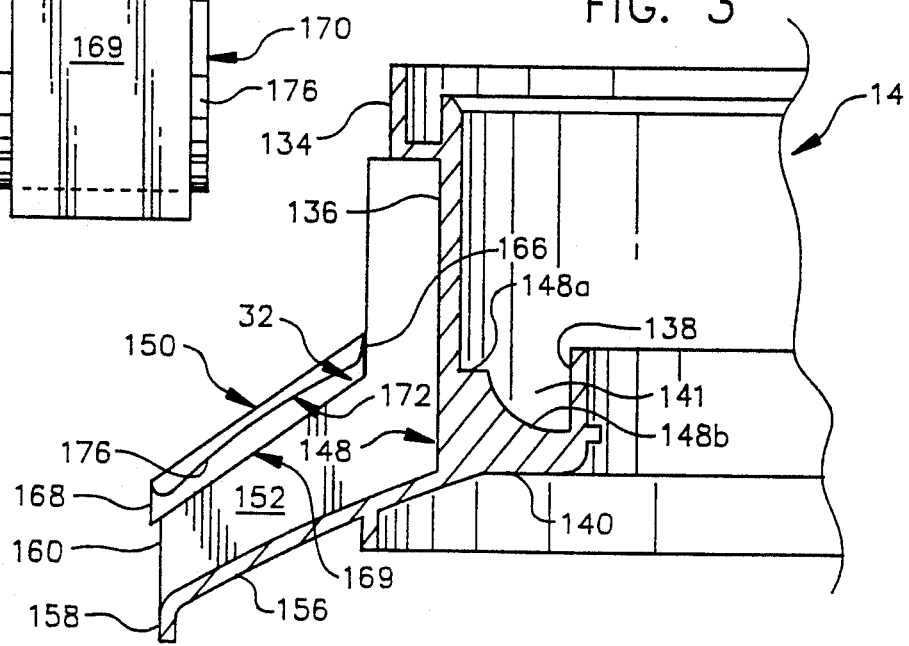
FIG. 3 is a fragmentary vertical section through and along one edge of the juice bowl of the juice extractor shown in FIG. 1 with the spray cap assembled to the bowl-integrated spout to prevent splashing of juice through the spout.

The complementary fit between the bottom edges 176 and 177 of the spray cap lips 170 and 172 and the upper edges 178 and 180 of the spout side walls, along with the frictional fit between the spray cap and these side walls, ensures that the liquid pouring through spout 32 will not escape from between the spray cap and the side walls. Also, as shown in FIG. 3, the juice bowl-juxtaposed end 166 of spray cap 150 is located above the upper edge 147 of juice bowl outlet 142. This is effective to keep juice from spraying out of juice bowl 14 over spray cap 150 despite the gap between the outer wall 134 and the splash wall 136 of the juice bowl.

Because it is only frictionally retained in place, spray cap 150 can be easily removed to clean the interior of the juice discharge spout if the use of the spray cap is considered inappropriate by the operator of juice extractor 10, or for any other purpose. Reinstallation of the spray cap is equally simple. This requires only that the spray cap be positioned above the juice spout 32 and then pressed downwardly into the position shown in FIGS. 1–3.

Lettering 182 on the upper surface 184 of the spray cap facilitates the correct end-for-end installation of the spray cap on juice discharge spout 32.

From the foregoing, it will be clear to the reader that the present invention may be embodied in many forms without departing from the spirit or essential characteristics of the invention. The above-described and illustrated embodiment is therefore to be considered in all respects as illustrative and not restrictive, the scope of the invention being indicated by the appended claims rather than the foregoing description. All changes that come within the meaning and scope of the claims are intended to be embraced therein.

What is claimed is:

1. A juice extractor which comprises:
a base which includes a motor;
a centrifugal juice extracting means which is supported from said base and is drive-connected to and rotatable by said motor;
a juice bowl for collecting extracted juice, said juice bowl: (a) being supported from said base, and (b) housing said juice extracting means; and
a cover supported from and above said juice bowl;

said juice bowl having a discharge spout for the juice collected in the juice bowl, said spout: (a) communicating with the interior of the juice bowl, (b) being located exteriorly of both said juice bowl and said cover, and (c) having an open top and spaced apart side walls; and said juice extractor further comprising a detachable spray cap also located exteriorly of said juice bowl and said cover, said spray cap spanning and being supported from the side walls of the juice discharge spout to keep juice exiting the juice bowl through said spout from splashing out of the spout through its open top.

2. A juice extractor as defined in claim 1 which has only frictional means for affixing the spray cap to the juice discharge spout.

3. A juice extractor as defined in claim 2 in which the spray cap is fabricated from an elastically distensible material.

4. A juice extractor as defined in claim 1 in which the side walls of the juice discharge spout have upper edges and said spray cap has a main body portion configured for a frictional fit between the side walls of the juice discharge spout and integral, spray cap positioning lips seatable on the upper edge of said side walls.

5. A juice extractor as defined in claim 4 in which the bottom edges of the positioning lips and the upper edges of the juice discharge spout side walls have complementary configurations.

6. A juice extractor which comprises:
a base which includes a motor;
a centrifugal juice extracting means which is supported from said base and is drive-connected to and rotatable by said motor;
a juice bowl for collecting extracted juice which is supported from said base and houses said juice extracting means; and
a cover supported from and above said juice bowl;
said juice bowl having a discharge spout for the juice collected in the juice bowl, said spout communicating with the interior of the juice bowl and having an open top and spaced apart side walls; and said juice extractor further comprising a detachable spray cap spanning and supported from the side walls of the juice discharge spout to keep juice exiting the juice bowl through said spout from splashing out of the spout through its open top, there being means on a surface of the spray cap which is visible with the cover supported on the juice bowl for orienting the spray cap with the correct end of the cap next to the juice bowl.

7. A juice extractor which comprises:
a base which includes a motor;
a centrifugal juice extracting means which is supported from said base and is drive-connected to and rotatable by said motor;
a juice bowl for collecting extracted juice which is supported from said base and houses said juice extracting means; and
a cover supported from and above said juice bowl;
said juice bowl having: an inner wall, a splash barrier spaced radially from the inner wall and cooperating therewith to form a juice collection sump, a discharge spout for the juice collected in the juice bowl which communicates with the interior of said bowl and the juice collection sump through an inlet in the splash wall of the juice bowl, and a baffle at the inlet end of the spout for keeping juice propelled by the juice extracting means through said inlet from splashing through the spout;
said discharge spout having an open top and spaced apart side walls; and
said juice extractor further comprising a detachable spray cap spanning and supported from the side walls of the juice discharge spout to keep juice exiting the juice bowl through said spout from splashing out of the spout through its open top.

8. A juice extractor as defined in claim 7 in which the baffle is radially oriented relative to a vertical axis of the juice bowl and extends from the top to the bottom of the juice spout inlet.

9. A juice extractor as defined in claim 8 in which the baffle is located in the juice collecting sump between the sides of the discharge spout and extends in the same direction as the spout.

* * * * *